(12) United States Patent
Durfee

(10) Patent No.: US 8,764,355 B2
(45) Date of Patent: Jul. 1, 2014

(54) STEP DRILL BIT

(75) Inventor: Laverne R. Durfee, Harmony, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 192 days.

(21) Appl. No.: 13/372,975

(22) Filed: Feb. 14, 2012

(65) Prior Publication Data

US 2012/0207557 A1    Aug. 16, 2012

Related U.S. Application Data

(60) Provisional application No. 61/442,996, filed on Feb. 15, 2011.

(51) Int. Cl.
*B23B 51/02* (2006.01)
(52) U.S. Cl.
USPC ........... 408/225; 408/144; 408/231; 408/233; 408/713
(58) Field of Classification Search
USPC ......... 408/144, 199, 223, 224, 225, 226, 227, 408/231, 232, 233, 713; 279/89, 93, 94, 279/104; 403/343, 349
See application file for complete search history.

(56) References Cited

U.S. PATENT DOCUMENTS

| | | | | |
|---|---|---|---|---|
| 764,664 | A * | 7/1904 | Jones | 175/327 |
| 1,919,745 | A * | 7/1933 | Raphael | 408/233 |
| 3,645,640 | A * | 2/1972 | Zukas | 408/192 |
| 5,427,477 | A * | 6/1995 | Weiss | 408/1 R |
| 5,921,727 | A * | 7/1999 | Depperman | 408/144 |
| 7,651,303 | B2 * | 1/2010 | Zick et al. | 408/80 |
| 8,070,397 | B2 | 12/2011 | Durfee | |
| 8,070,398 | B2 | 12/2011 | Durfee | |
| 2008/0029311 | A1 | 2/2008 | Seeley | |

* cited by examiner

*Primary Examiner* — Eric A Gates
*Assistant Examiner* — Michael Vitale
(74) *Attorney, Agent, or Firm* — Dennis J. Williamson; Moore and Van Allen PLLC

(57) ABSTRACT

A step drill bit comprises a body. A cutting edge insert is removably attached to the body. The body may be made of a first material and the cutting edge insert may be made of a second material where the second material is different than the first material. The cutting edge insert may define a plurality of progressively larger cutting diameters.

21 Claims, 8 Drawing Sheets

STEP DRILL BIT

This application claims benefit of priority under 35 U.S.C. §119(e) to the filing date of to U.S. Provisional Application No. 61/442,996 as filed on Feb. 15, 2011, which is incorporated herein by reference in its entirety.

BACKGROUND

The invention relates generally to drill bits and more particularly to step drill bits. A step drill bit typically has a graduated design that permits drilling of variously sized holes without changing the bit. Step drill bits are designed for use with power drills and may be used on all materials but are specially designed for use on metals.

SUMMARY

A step drill bit comprises a body. A cutting edge insert is removably attached to the body where the cutting edge insert comprises a plurality of graduated steps. The cutting edge insert extends along the length of the body.

The body may be made of a first material and the cutting edge insert may be made of a second material where the second material is different than the first material. The second material may be harder than the first material and the first material may be a lower friction material than the second material. The body may comprise a shank attached to a head, where the cutting edge insert is attached to the head. A first groove may be formed on the head and the cutting edge insert may be located in the groove. The head may have a generally truncated conical shape that narrows from the shank to a distal end of the head. A second groove may be formed on the head that is spaced from the first groove. The second groove may be spaced from the first groove approximately 180 degrees. The first groove may comprise a first face that is disposed substantially parallel to a first diameter of the body and a second face that is disposed at an angle relative to the first face. The second face may be centered on the diameter of the body. The cutting edge insert may be supported in the first groove such that the first face and the second face abut and support the cutting edge insert. A locking ring may be provided having a cam surface that engages the cutting edge insert to retain the cutting edge insert on the body.

A step drill bit comprises a body. A cutting edge insert is removably attached to the body where the cutting edge insert comprises a first plurality of graduated steps and a second plurality of graduated steps where each one of the first plurality of steps is arranged in a pair with one of the second plurality of graduated steps to define a plurality of progressively larger cutting diameters.

The body may comprise a shank and a head where the head and the shank are formed of a one-piece member. A first groove and a second groove may be formed on the head. The first groove may be spaced from the second groove approximately 180 degrees. The cutting edge insert may comprise a first leg on which the first plurality of graduated steps are formed and a second leg on which the second plurality of graduated steps are formed where the first leg fits into the first groove and the second leg fits into the second groove. A lock ring may comprise a first cam surface and a second cam surface. The first leg may comprise a first cam follower that engages the first cam surface and the second leg may comprise a second cam follower that engages the second cam. The lock ring may be rotatably mounted on the body such that the engagement of the first cam follower with the first cam surface and the engagement of the second cam follower with the second cam surface secures the cutting edge insert on the body. A cutting tip may be provided between the first leg and the second leg. A lock mechanism may be provided for locking the lock ring in position relative to the shank.

DETAILED DESCRIPTION OF EMBODIMENTS OF THE INVENTION

Figure 1:
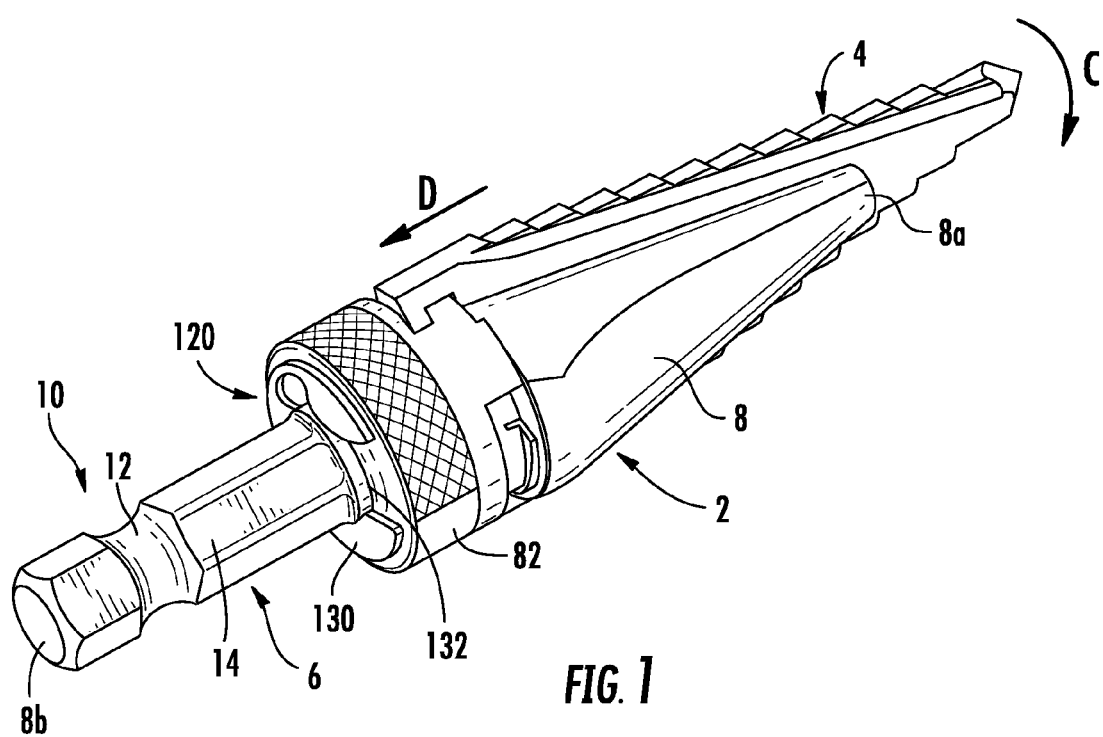
FIG. 1 is a perspective view of an embodiment of the step drill bit of the invention.
Figure 2:
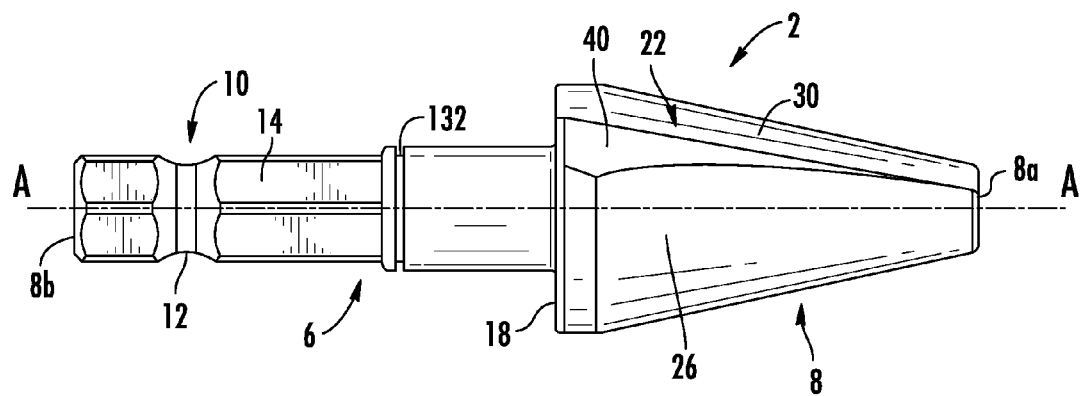
FIG. 2 is a side view of an embodiment of the body of the step drill bit of FIG. 1.
Figure 3:
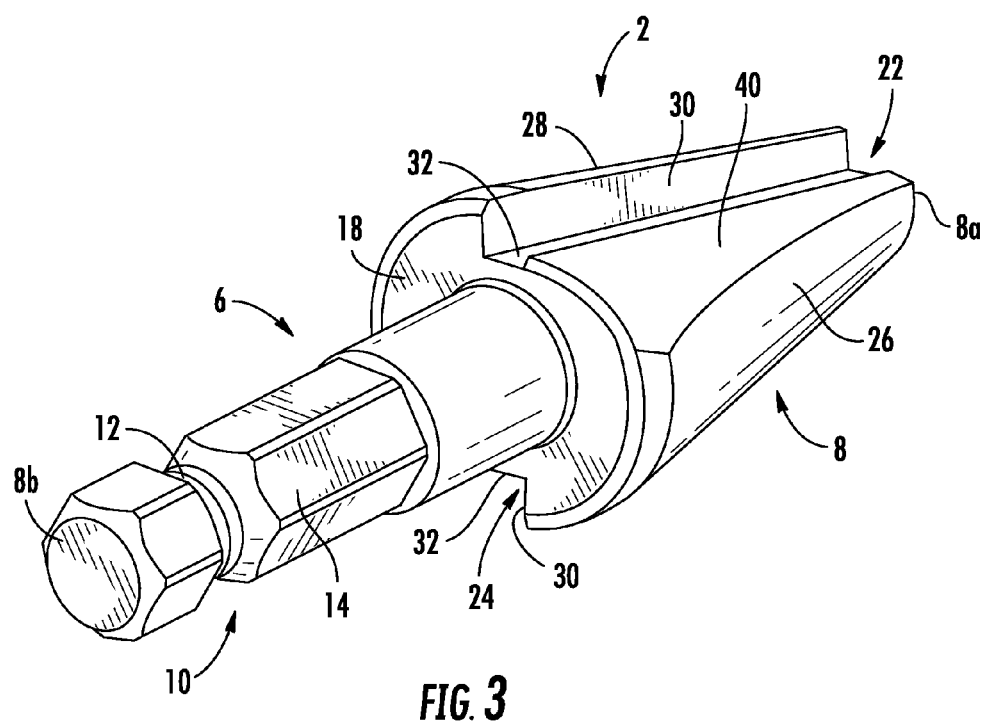
FIG. 3 is a perspective view of the body of FIG. 2.

The invention is directed to a step drill bit that comprises a cutting edge or edges that are made of a different material than the base or body of the bit. The base or body of the bit may be manufactured by a casting or injection molding process rather than the traditional machining process used on these types of drill bit. The cutting edge insert or inserts may be machined, pressed sintered metal, cast or injection molded. The cutting edge inserts may also be stamped out of a strip of material using a progressive stamping die. Heat treatment may be optimized for both the body and the cutting edge insert. High end surface coatings may be used only on the cutting edge insert, which reduces the cost of applying the coating when compared to coating the entire bit. Cutting edge inserts having different configurations specifically designed to perform various drilling applications may be used such that the bit may be customized for a particular application by attaching an application specific insert to the body. By using or applying a second material on the cutting edge that is different than the material of the body different and better cutting edge tip geometries may be obtained.

The cutting edge insert may be mechanically fastened into the body with a staking operation or the body and cutting edge insert may be made with mating angular surfaces that are self-locking. Another alternative would be to use screws or clamps to attach the inserts to the body, although the use of the additional parts may increase the cost of the bit. One preferred method uses a rotating lock ring on the shank of the bit to lock and release the cutting edge insert onto a universal holder for the inserts as shown below. Another alternative is the application of a second material to the base step drill in a liquid or semi liquid manner. The second material may be injected or welded onto the drill to create the second material where it is specifically needed. Cutting edges may be formed in the second material by grinding or other processes.

By using a multiple material composition for a step drill bit the cutting edge can be improved and the base material can be designed for extreme low friction. As a result, the cutting edge insert may be improved for one requirement (e.g. durability) while the body is improved for a different requirement (e.g. low friction). This eliminates the problem in single material traditional step drill bits where a compromise is made between the different requirements. The multiple piece step drill bit provides a lower cost bit with a better performance platform.

The durability of the cutting edges of a step drill bit such as the IRWIN® UNIBIT® stepdrill bit can be improved by brazing in small carbide inserts (or one long insert) on the cutting edges. The process may use technologies in cutting tool coatings and material deposition methods. The flute designs can also be altered to reduce the cutting forces and "free" the bits up. The step drill bit of the invention addresses both manufacturing cost and cutting edge durability issues.

One embodiment of the step bit of the invention is shown in FIGS. 1 through 11 and comprises a body 2 and a separate cutting edge insert 4 that may be attached to the body 2. In one embodiment the cutting edge insert 4 is releasably attached to the body 2 such that it may be removed and replaced. The insert 4 may be removed and replaced if it becomes worn, breaks or the like or it may be replaced by an insert having different characteristics such as different dimensions, materials, cutting edges or the like. The body may be made of a first material and the cutting edge insert may be made of a second material where the second material is different than the first material. The material of the insert 4 may be harder than the material of the body 2. The material of the body 2 may be a lower friction material than the material of the insert 4.

The body 2 comprises a generally cylindrical shank 6 attached to a generally truncated conical head 8. In one embodiment the head 8 and shank 6 may be formed as a one-piece, unitary member made by casting or injection molding. The body 2 may be made of ferrous or non-ferrous materials. While casting or injection molding the body 2 is a preferred cost effective method of making the body, the body may also be machined. Further, the components may be made separate from another and joined together by welding or the like to create a unitary body 2. The use of various coatings may be employed such as Physical Vapor Deposition (VPD) coatings such as TiN or anti-stick coatings such as fluorocarbons to improve the body's interaction with the material being drilled.

The shank 6 may comprise a quick connect coupling 10 at a distal end that is adapted to be engaged by the chuck of a rotary tool such as a power drill. The quick connect coupling 10 may comprise an annular recess 12 formed in a hexagonal shaft 14 although other designs may be used.

The head 8 has a generally truncated conical shape that narrows from the shank 6 to the distal end 8a of the head. The head 8 may have a greater diameter than the shank 6 such that a shoulder 18 is formed between the head 8 and the shank 6. A first groove 22 is formed on the head 8 and extends along the longitudinal axis A-A of the bit from the distal end 8a to the shoulder 18. A second groove 24 is formed on the head 8 approximately 180 degrees from the first groove where the second groove also extends along the longitudinal axis A-A of the bit from the distal end 8a to the shoulder 18. The first groove 22 and the second groove 24 are coplanar with the axis A-A and when the grooves 22 and 24 are spaced 180 degrees from one another the two grooves and the axis A-A are all coplanar.

Figure 4:
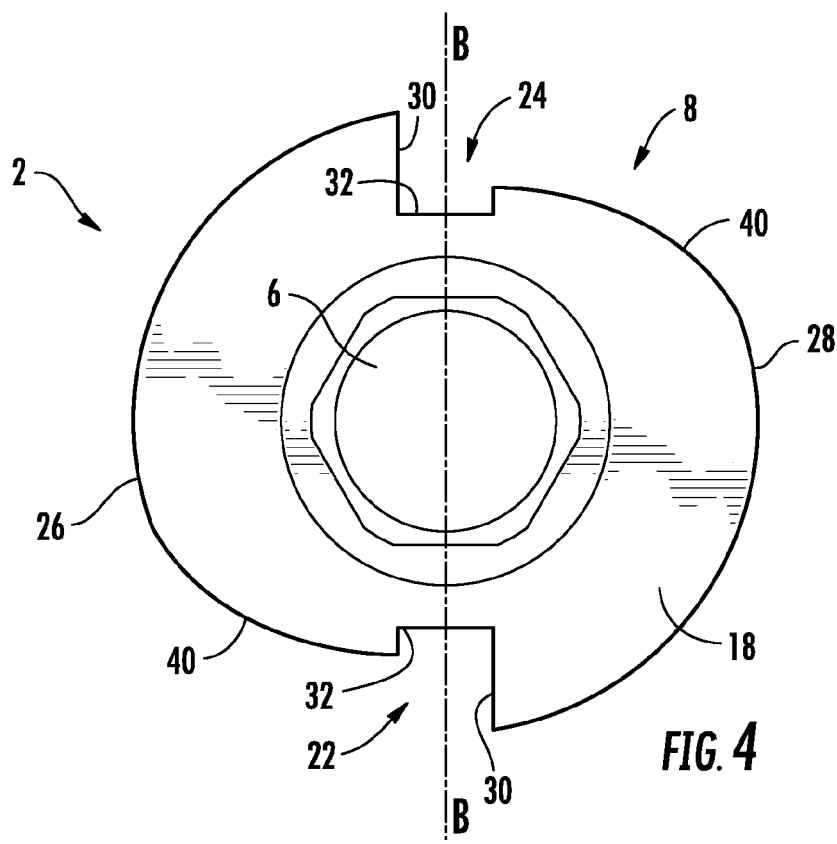
FIG. 4 is a first end view of the body of FIG. 2.
Figure 5:
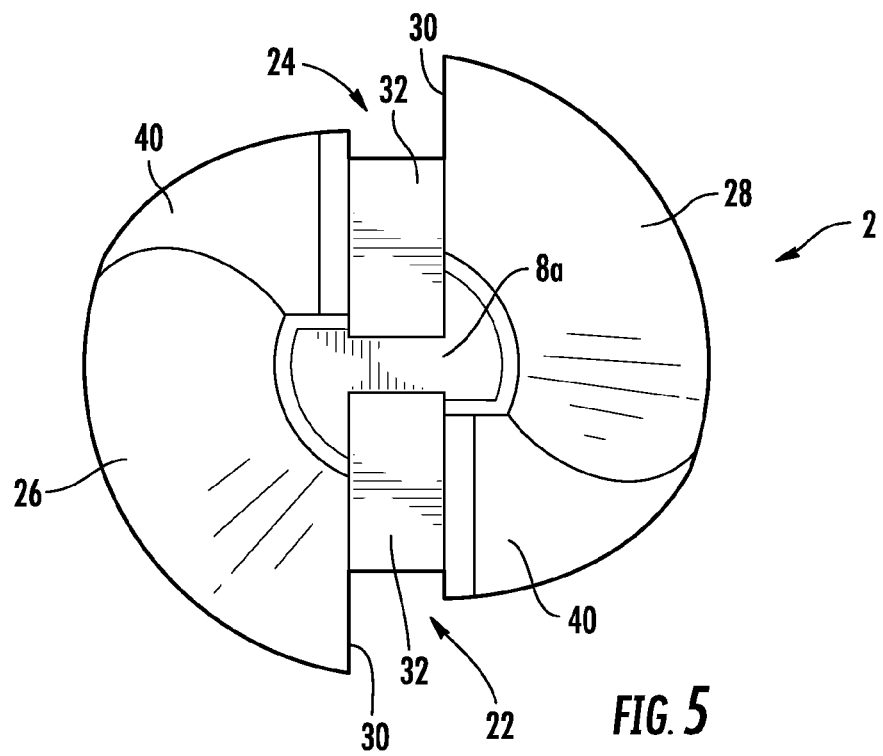
FIG. 5 is a second end view of the body of FIG. 2.

Referring more particularly to FIG. 4, the grooves 22 and 24 divide the head into a first outer face 26 and a second outer face 28. Each groove 22 and 24 comprises a first face 30 that is disposed substantially parallel to a first diameter B-B of the body. Each groove 22 and 24 comprises a second face 32 that is disposed substantially perpendicular to the first diameter B-B of the body and to the first face 30. The first face 30 and the second face 32 are disposed such that the second face 32 is centered on the diameter of the body B-B. The faces 30 and 32 form a seat for receiving the insert 4 as will hereinafter be described.

Each groove 22 and 24 also comprises a relief face 40 that extends from adjacent to the second face 32 to the outer surfaces 26 and 28 of the head 8. The relief face 40 gradually extends away from the longitudinal axis A-A as it extends between the second face 32 and the outer surfaces 26 or 28 of head 8 such that a smooth transition is created between the recessed face 30 and the outer face 26 and 28. Other configurations of face 40 may be used to adapt to different drilling conditions.

Figure 6:
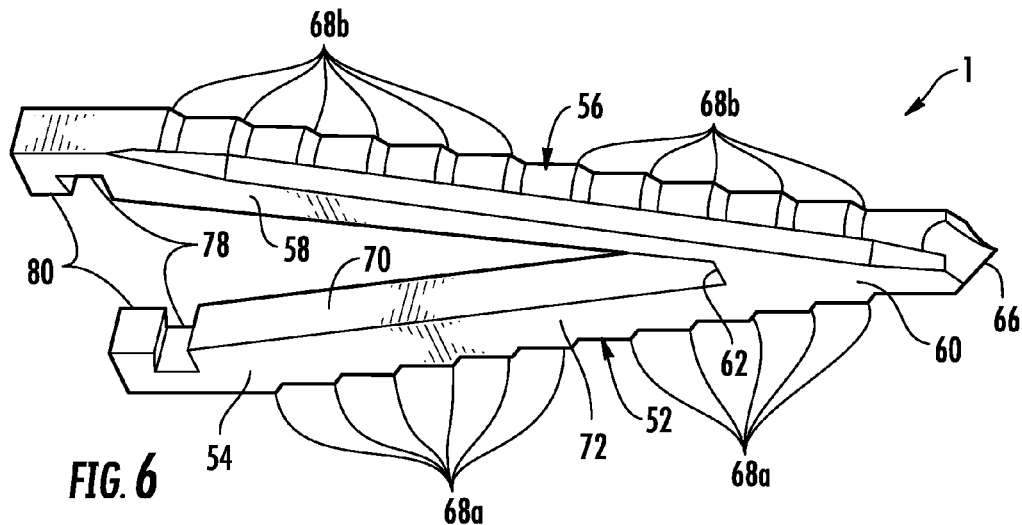
FIG. 6 is a perspective view of an embodiment of the cutting edge insert of the step drill bit of FIG. 1.
Figure 7:
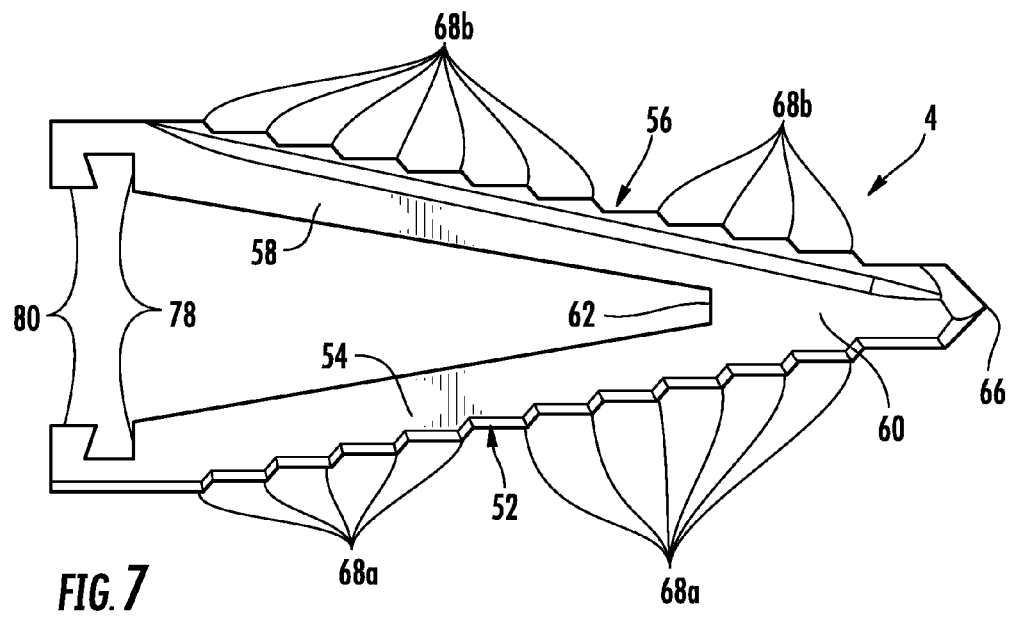
FIG. 7 is a side view of the cutting edge insert of FIG. 6.
Figure 8:
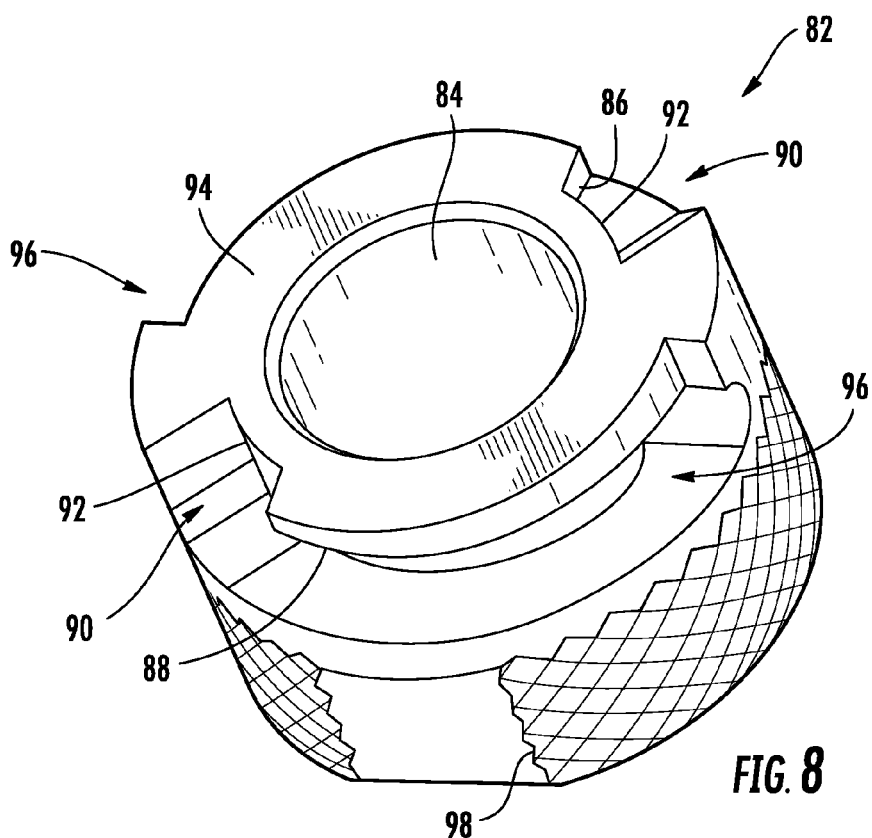
FIG. 8 is a perspective view of an embodiment of the lock ring of the step drill bit of FIG. 1.
Figure 9:
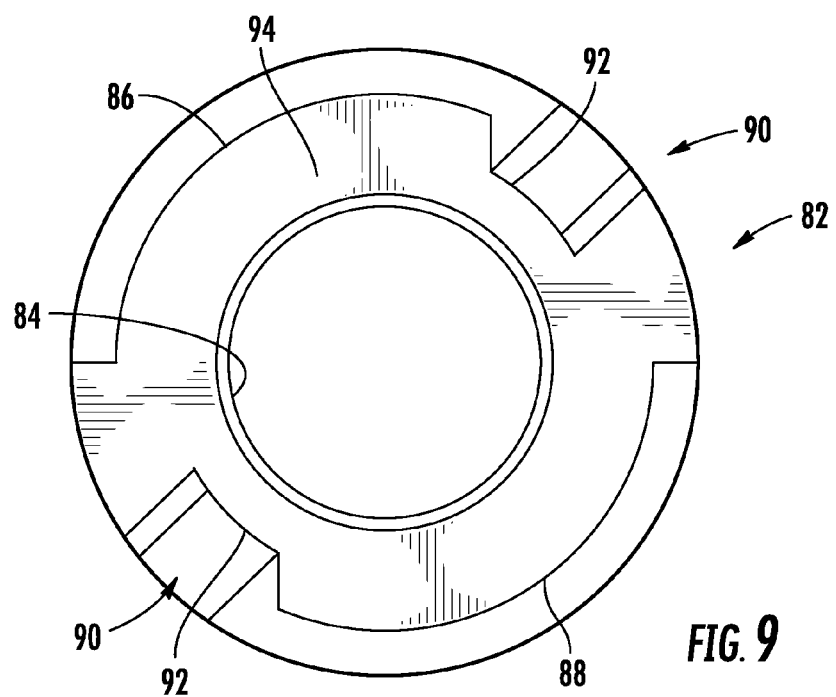
FIG. 9 is a first end view of the lock ring of FIG. 2.
Figure 10:
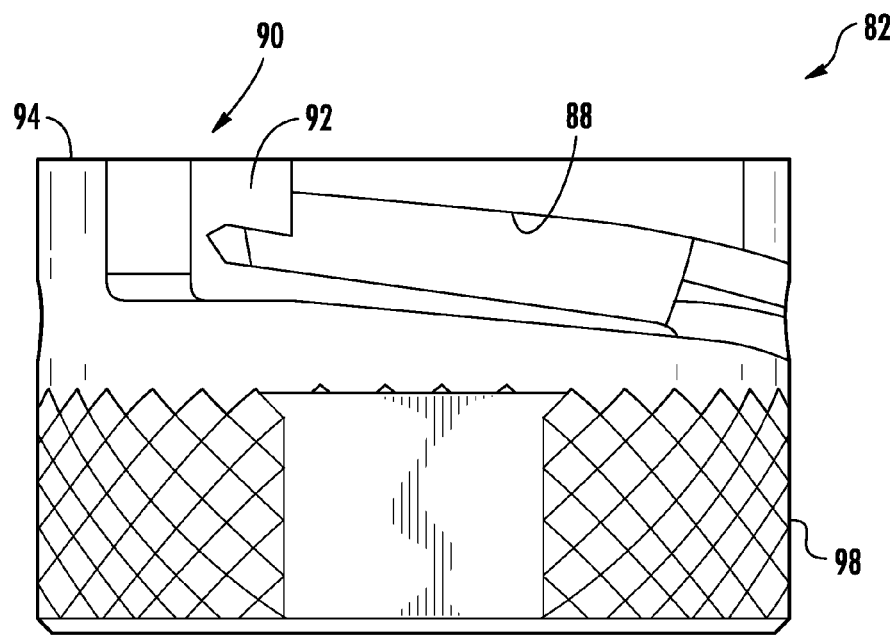
FIG. 10 is a side view of the lock ring of FIG. 2.
Figure 11:
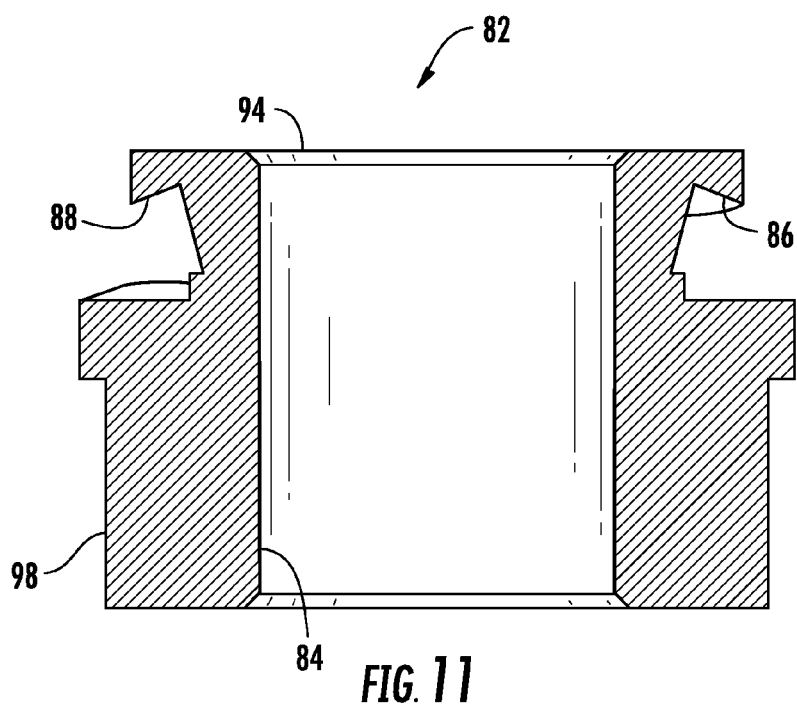
FIG. 11 is a section view of the lock ring of FIG. 2.

Referring more particularly to FIGS. 6 and 7, an embodiment of a cutting edge insert 4 is shown made of a suitable material such as high strength steel. The use of surface coatings may be applied such as TiN, Nano technology and other PVD coatings. Other surface finishes such as black oxide and gold oxide may also be used. The insert 4 comprises a first leg 54 on which a first cutting edge 52 is formed and a second leg 58 on which a second cutting edge 56 is formed. The legs 54 and 58 are disposed at an angle relative to one another such that the first leg 54 fits into the first groove 22 and the second leg 58 fits into the second groove 24. Because the head 8 is formed generally as a truncated cone the first leg 54 is disposed at an angle relative to the second leg 58 such that the insert 4 has a generally V-shape, although the head 8 and insert 4 may have other geometries. The first leg 54 and the second leg 58 are joined by a tip portion 60. A groin 62 is formed between the legs 54, 58 that extends across the distal end 8a of the head 8 when the insert 4 is mounted on the head 8. The tip portion 60 may comprise a cutting point or lead point 66 that is disposed on the longitudinal axis A-A of the bit. The cutting point or lead point 66 may be eliminated if the step drill bit is not intended to be a self-starting bit. In one preferred embodiment the first leg 54, the second leg 58 and the tip potion 60 are formed of a single, unitary piece of material. Cutting edge 52 comprises a series of steps 68a and cutting edge 56 comprises a series of steps 68b. Each step 68a on cutting edge 52 is arranged in a pair with a step 68b on cutting edge 56 that together that define a bore diameter. The pairs of steps define progressively larger cutting diameters such that the step drill bit may drill holes of any of the defined cutting diameters. While two cutting edges form the insert the insert may comprise a greater or fewer number of cutting edges.

The first leg 54 and second leg 58 include engagement surfaces that engage with mating engagement surfaces on the first groove 22 and the second groove 24. The first leg 54 fits into the first groove 22 such that the first face 30 and the second face 32 of the first groove 22 abut and support the interior face 70 and the trailing face 72 of the first leg 54. The second leg 58 fits into the second groove 24 such that the first face 30 and the second face 32 of the second groove 24 abut and support the interior face 70 and the trailing face 72 of the second leg 58. The first leg 54 and the second leg 58 may be in contact with and supported by the groove surfaces along the entire length of the grooves. In use the head rotates in the direction of arrow C (FIG. 1) such that the faces 30 and 32 of the grooves 22 and 24 support the insert 4 along the entire length of the first leg 54 and the second leg 58 to oppose the forces generated on the insert by the workpiece during the drilling operation.

Each of the first leg 54 and the second leg 58 include a cam follower 80 at the distal end thereof for mounting the insert 4 on the head 2 as will hereinafter be described. In the illustrated embodiment the cam followers 80 are formed by a notch or recess 78.

Referring more particularly to FIGS. 8 through 11, a lock ring 82 may be used to secure the insert 4 to the body 2. An internal bore 84 extends through the lock ring 82 that receives shank 6. The lock ring 82 also comprises a first helical cam surface 86 and a second helical cam surface 88. The cam surfaces 86, 88 may be formed as slots or recesses in the peripheral wall of the lock ring 82. Each cam surface 86, 88 comprises a first end 90 having an opening 92 that is open to the surface 94 of the lock ring 82 for receiving the cam followers 80 during assembly of the bit. Each cam surface 86, 88 terminates in a second end 96. Between the first end 92 and the second end 96 of each of the cam surfaces 86, 88, the cam surfaces extend gradually away from the surface 94. In the assembled bit the cam surfaces 86 and 88 extend away from the end 8a of the body and toward the end 8b of the body 2.

To assemble the step bit, the insert 4 is slid onto the end of the body 2 such that the first leg 54 fits into the first groove 22 and the second leg 58 fits into the second groove 24 and the groin 62 abuts the end 8a of the body 2. The insert 4 is disposed in the grooves 22, 24 such that the first face 30 and the second face 32 of the first groove 22 abut and support the interior face 70 and the trailing face 72 of the first leg 54 and the first face 30 and the second face 32 of the second groove 24 abut and support the interior face 70 and the trailing face 72 of the second leg 58. The ends of the cutting edges extend beyond the head 8 and into the area defined by shank 6.

The lock ring 82 is inserted onto the shank 6 by inserting the shank into the bore 84 of the lock ring. The openings 90 are aligned with the ends of the legs 54 and 58 such that when the lock ring 82 is moved down the length of the shank 6 the cam followers 80 are inserted into the openings 90. The cam followers 80 are arranged such that the cam followers 80 fit into the recesses that form the cam surfaces 84 and 86. It is to be understood that either of the insert or the lock ring may be mounted on the body first and that these components may be mounted on the body substantially simultaneously.

The lock ring 82 is then rotated relative to the body 2 and inserted 4. As the lock ring 82 rotates the cam surfaces 84 and 86 engage and push against the cam followers 80. The cam surfaces 84 and 86 are angled such that as the lock ring is rotated the engagement of the cam surfaces 86, 88 with the cam followers 80 pulls the insert 2 in the direction of arrow D (FIG. 1) into tight engagement with the body 2 where the legs 54 and 58 are pulled into tight engagement with the grooves 22 and 24.

Figure 12:
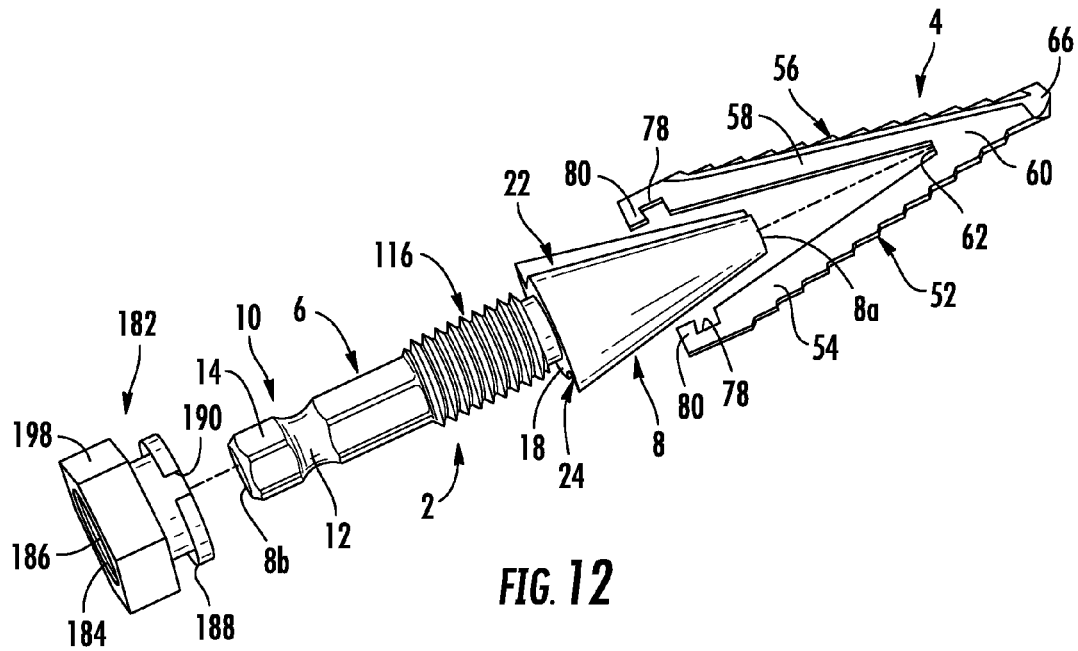
FIG. 12 is an exploded perspective view of another embodiment of the step drill bit of the invention.
Figure 13:
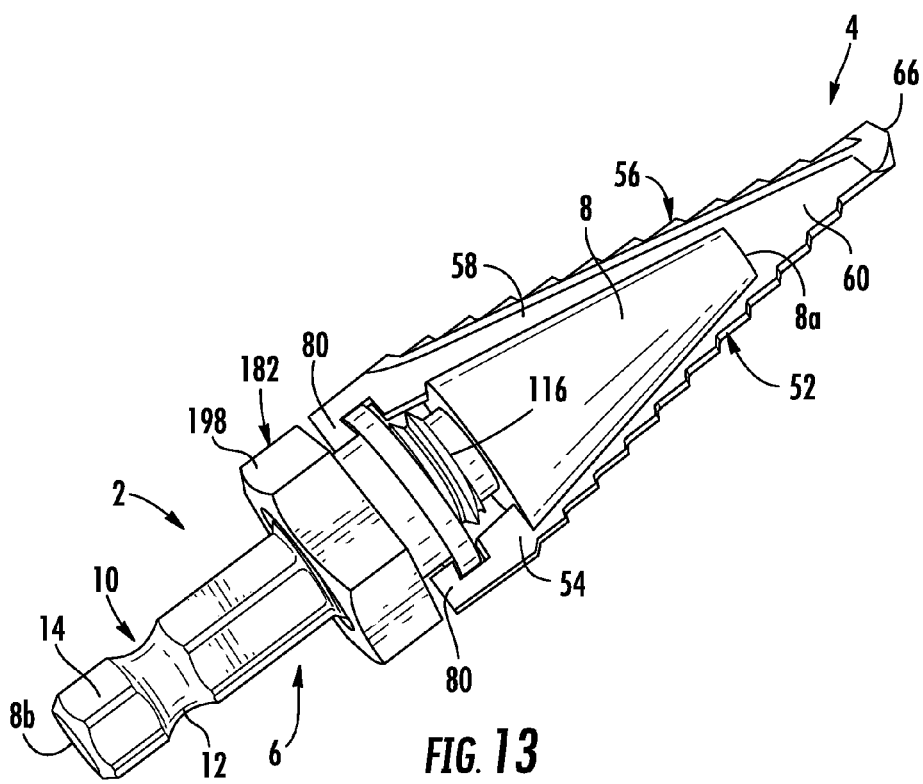
FIG. 13 is a perspective view of the step drill bit of FIG. 12.

Another embodiment of the drill bit is shown in FIGS. 12 and 13 where like references numerals are used to identify the same components previously described with respect to the embodiment of FIGS. 1 through 11. As previously explained the bit comprises a body 2 and a separate cutting edge insert 4 that may be attached to the body 2. The head 8, grooves 22 and 24 and insert 4 are configured and arranged as previously described with respect to the embodiment of FIGS. 1 through 11. The body 2 comprises a generally cylindrical shank 6 attached to a generally conical head 8 as previously described; however, screwthreads 116 are formed on the shank 6 between the coupling 10 and the head 8. A lock ring 182 is used to secure the insert to the head.

In one embodiment, the lock ring 182 comprises the cam surfaces 86, 88 as previously described. The central bore 184 in lock ring 182 comprises internal threads 186 that threadably engage the threads 116 formed on the body. The cam followers 80 on arms 54 and 58 are arranged such that the cam followers 80 fit into the recesses 90 at the first end of the cam surfaces 84 and 86. The cam followers 80 fit into the cam surfaces 84 and 86 at a point just prior to where the threads 186 on the lock ring 182 engage the threads 116 on the shank 6. When the lock ring 182 is rotated the threads 186 and 116 engage one another such that the lock ring 182 is threaded onto the shank 6. The cam surfaces 86 and 88 are arranged at a steeper angle than the pitch of the threads 116, 186 such that as the lock ring 182 is threaded on the shank 6 the insert 2 is pulled into tight engagement with the head 8.

In an alternate embodiment the lock ring 182 comprises a cam surface 188 that may be disposed substantially parallel to the axis A-A as shown in FIGS. 12 and 13. The cam surface 188 includes openings 190 that receive the cam followers 80 during assembly of the bit. To assemble this embodiment of the bit, the lock ring 182 is screwed onto threads 116 to a position where the openings 190 are positioned to receive the cam followers 80. The openings 190 are positioned in substantial alignment with the grooves 22 and 24. The insert 4 is inserted over the head 8 and positioned in grooves 22 and 24 such that the cam followers 80 are inserted through the openings 190. The lock ring 182 is rotated in the loosening direction such that the lock ring 182 moves toward end 8b of the body. As the lock ring moves toward end 8b the cam surface 186 pulls the insert 4 into tight engagement with the head. While the cam surface 182 is described as being perpendicular to the axis A-A, the cam surface 186 may be formed at an angle relative to axis A-A to increase the tightening effect caused by rotation of the lock ring.

Figure 14:
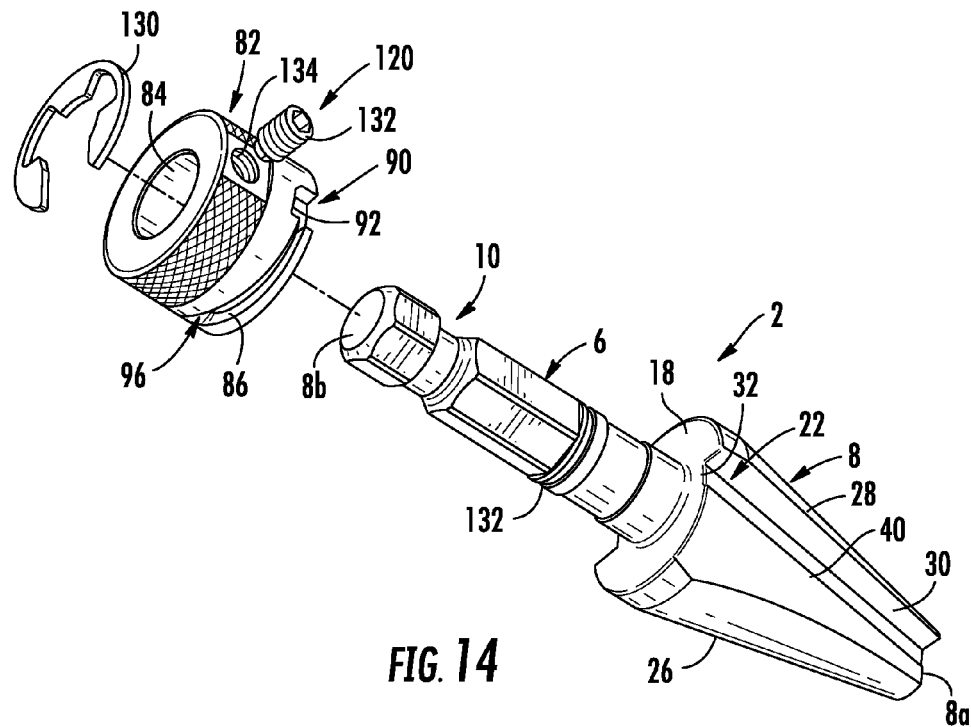
FIG. 14 is an exploded perspective view of an embodiment of a lock mechanism usable in the step drill bit of the invention.
Figure 15:
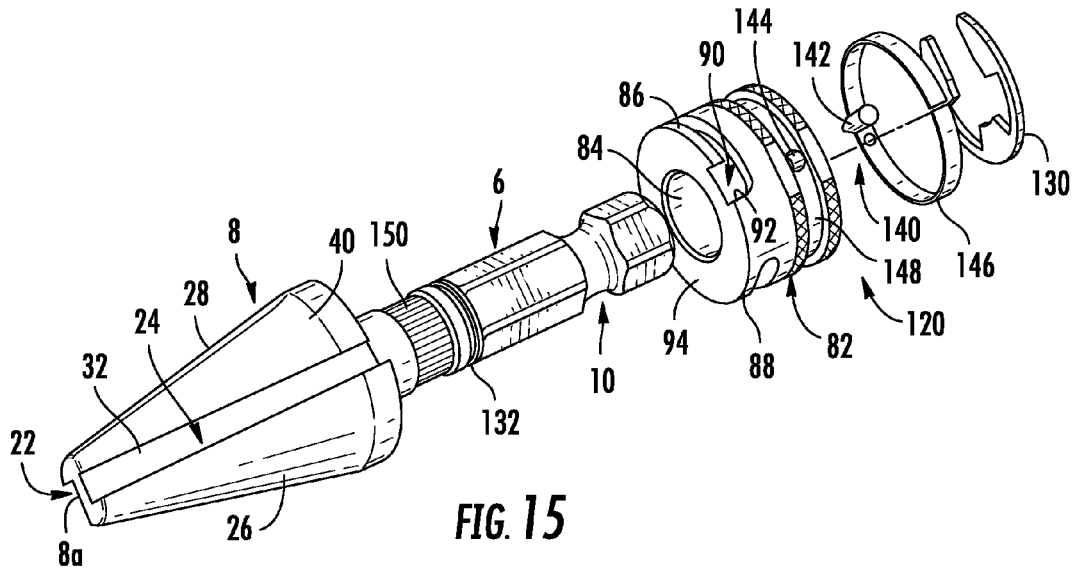
FIG. 15 is an exploded perspective view of another embodiment of a lock mechanism usable in the step drill bit of the invention.

A lock mechanism 120 may be used to lock the lock ring 82 in position. In one example embodiment a lock washer 130 may be then snap fit into a recess 132 on the shank 6 to secure the lock ring in position using a friction fit as shown in FIG. 1. Other lock mechanisms may be used in place of or in conjunction with the lock washer 130 to secure the lock ring in position. Referring to FIG. 14, another example embodiment of the lock mechanism 120 is shown comprising a set screw 132 that engages a threaded hole 134 formed in the lock ring 84. The threaded hole 134 communicates with the bore 84 such that the set screw 132 may be tightened into engagement with the shank 6 to secure the lock ring 82 in position after the lock ring secures the cutting edge insert 4 to the head 8. Referring to FIG. 15, another example embodiment of the lock mechanism 120 is shown comprising a ratchet mechanism 140. The ratchet mechanism 140 comprises a pawl 142 that is mounted in a bore 144 formed in the lock ring 82 that communicates with bore 84 such that the pawl 142 may engage the shank 6. The pawl 142 is biased to the extended locking position by a spring 146. In the illustrated embodiment the spring 146 comprises a band spring that surrounds the periphery of the lock ring 82 and sits in an annular groove 148. The pawl 142 engages ratchet teeth 150 formed on the shank 6 where the pawl 142 and teeth 150 are configured such that the lock ring 82 may rotate in the locking direction relative to the shank but is prevented from rotating in the loosening direction by the engagement of the pawl 142 with the teeth 150. The pawl 142 may be moved against the bias provided by spring 146 to release the pawl 142 from engagement with teeth 150 such that the lock ring 82 may be loosened for removal of the insert 4 from the body 2. The lock washer 130, set screw 132 and ratchet mechanism 140 may also be used alone or in combination with one another.

To remove the cutting edge insert 4 from the body 2 the lock mechanism 120 is released and the lock ring 82 is rotated in the loosening direction until the cam followers 80 are positioned in the openings 90. The cutting edge insert 4 may then be removed from the body and be replaced with a new or different insert 4. As previously explained, the cutting edge insert may be removed due to wear or breakage and be replaced with the same type of insert. Alternatively, the insert may be removed and replaced with a different type of insert. Replacing the insert with a different type of insert allows the body 2 to be used as part of a drilling set where the different types of cutting edge inserts 4 may be made of different materials, have different size cutting diameters, or be designed to cut different types of materials. The user may purchase the body 2 and a plurality of different types of cutting edge inserts 4, and/or replacement inserts of the same type, such that the step drill bit provide a cost effective system that may be modified by the user to suit their needs.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A step drill bit comprising:
   a body comprising a head, a first groove formed on the head and a second groove formed on the head, the second groove being spaced from the first groove wherein the first groove comprises a first face and the second groove comprises a second face, and a distal end extending between the first groove and the second groove;
   a cutting edge insert removably attached to the body where the cutting edge insert comprises a first plurality of graduated steps on a first leg and a second plurality of graduated steps on a second leg where each one of the first plurality of steps is arranged in a pair with one of the second plurality of graduated steps to define a plurality of progressively larger cutting diameters;
   the first leg being connected to the second leg by a groin;
   the first leg being positioned in the first groove and the second leg being positioned in the second groove such that the first leg is supported by the first face and the second leg is supported by the second face and the groin is supported by the distal end;
   and a locking collar mounted on the body and rotatable relative to the body, the locking collar comprising at least a first cam surface for engaging the cutting edge insert where rotation of the locking collar causes the first cam surface to exert a force on the cutting edge insert pulling the first leg into engagement with the first surface, the second leg into engagement with the second surface and the groin into engagement with the distal end.

2. The step drill bit of claim 1 wherein the body is made of a first material and the cutting edge insert is made of a second material where the second material is different than the first material.

3. The step drill bit of claim 2 wherein the second material is harder than the first material and the first material is a lower friction material than the second material.

4. The step drill bit of claim 1 wherein the body comprises a shank attached to the head.

5. The step drill bit of claim 4 wherein the head and the shank are formed of a one-piece member.

6. The step drill bit of claim 4 wherein the lock ring comprises a bore that receives the shank.

7. The step drill bit of claim 1 wherein the head has a generally truncated conical shape that narrows from the shank to the distal end of the head.

8. The step drill bit of claim 1 wherein the second groove is spaced from the first groove approximately 180 degrees.

9. The step drill bit of claim 1 wherein the first face is disposed substantially parallel to a first diameter of the body and the first groove comprises a third face that is disposed at an angle relative to the first face.

10. The step drill bit of claim 9 wherein the third face is centered on the diameter of the body.

11. The step drill bit of claim 10 wherein the first leg is supported in the first groove such that the first face and the third face abut and support the first leg.

12. The step drill bit of claim 1 wherein the lock ring comprises a second cam surface, the first leg comprises a first cam follower that engages the first cam surface and the second leg comprises a second cam follower that engages the second cam surface, engagement of the first cam follower with the first cam surface and engagement of the second cam follower with the second cam surface exerts the force.

13. The step drill bit of claim 12 further comprising a cutting tip between the first leg and the second leg.

14. The step drill bit of claim 12 wherein the lock ring comprises a first opening that communicates with the first cam surface and a second opening that communicates with the second cam surface where the first opening receives the first cam follower and the second opening receives the second cam follower.

15. The step drill bit of claim 1 further comprising a lock mechanism for locking the lock ring in position relative to the body to prevent rotation of the lock ring relative to the cutting edge insert.

16. The step drill bit of claim 15 wherein the lock mechanism comprises one of a lock washer; a set screw that engages a threaded hole formed in the lock ring; and a ratchet comprising a biased pawl on one of the lock ring and the body that engages ratchet teeth on another one of the body and the lock ring.

17. The step drill bit of claim 1 wherein the lock ring comprises a first set of threads that threadably engage a second set of threads on the body.

18. The step drill bit of claim 17 wherein the at least a first cam surface is arranged at a steeper angle than a pitch of the second set of threads such that as the first set of threads threadably engage the set of threads the cutting edge insert is pulled into tight engagement with the head.

19. The step drill bit of claim 1 wherein the at least a first cam surface is perpendicular to a longitudinal axis of the body.

20. The step drill bit of claim 1 further comprising a plurality of different types of cutting edge inserts.

21. A step drill bit comprising:
   a body comprising a head and a groove formed on the head;
   a cutting edge insert removably attached to the body where the cutting edge insert comprises a first plurality of graduated steps defining a plurality of progressively larger cutting diameters, the cutting edge insert being positioned in the groove;
   and a locking collar mounted on the body and rotatable relative to the body, the locking collar comprising a first cam surface for engaging a cam follower on the cutting edge insert where rotation of the locking collar causes the first cam surface to exert a force on the cam follower pulling the cutting edge insert into engagement with the body.

* * * * *